Dec. 21, 1926.  
F. O'NEILL  
ADJUSTABLE GLASS FEEDER  
Filed March 1, 1924    3 Sheets-Sheet 1
1,611,362
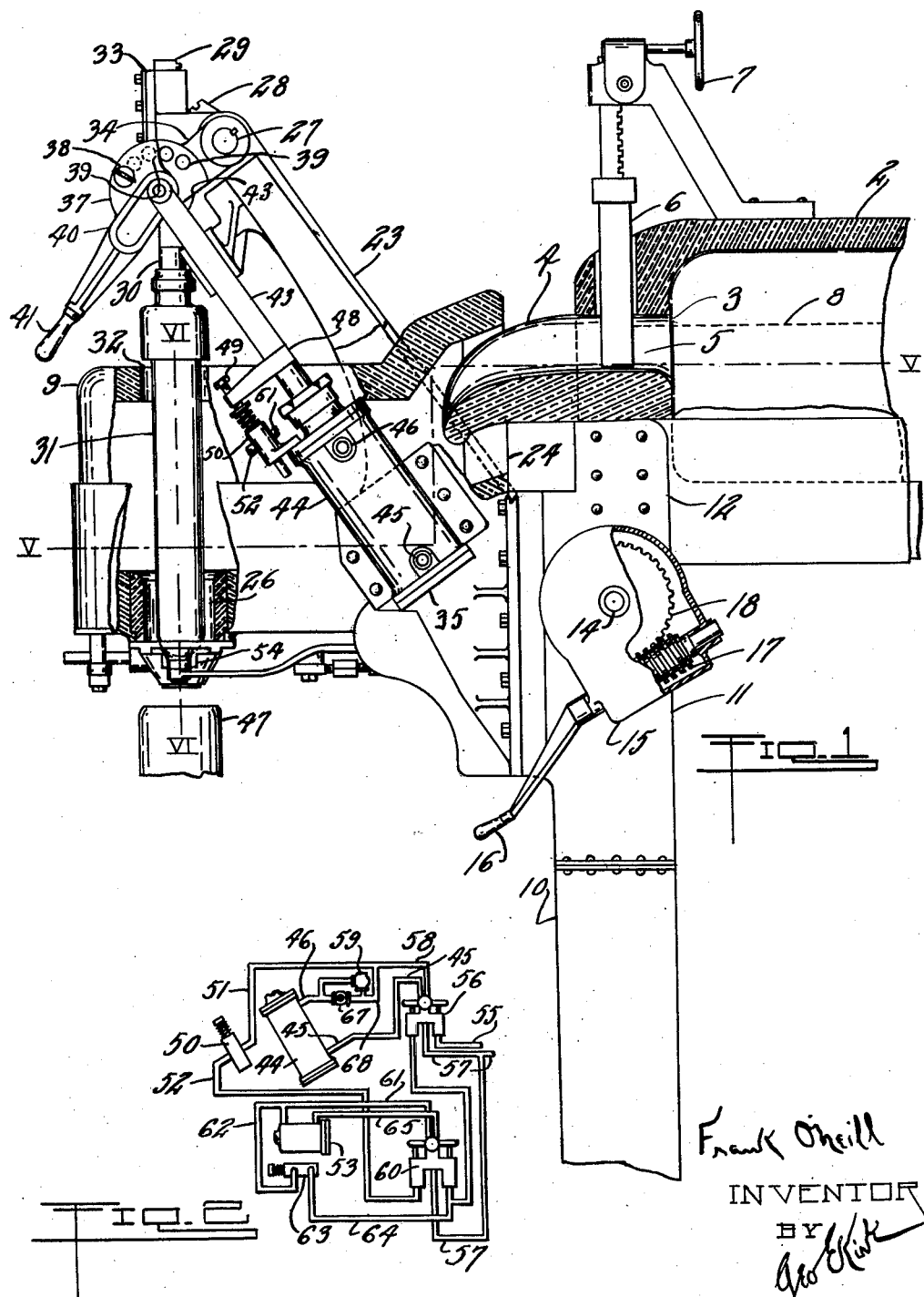
Frank O'Neill  
INVENTOR  
BY  
ATTORNEY Dec. 21, 1926.
F. O'NEILL
1,611,362
ADJUSTABLE GLASS FEEDER
Filed March 1, 1924   3 Sheets-Sheet 2
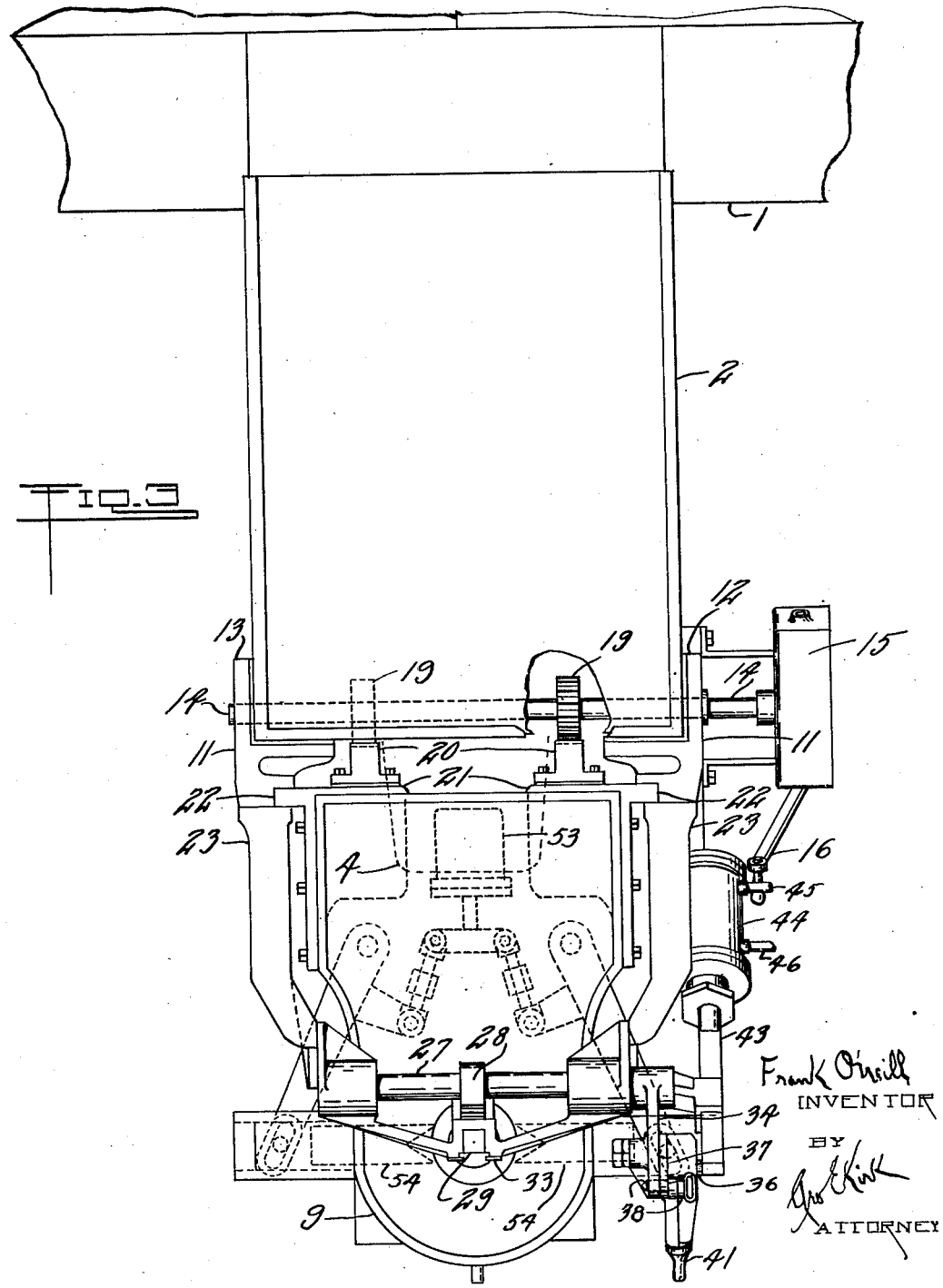

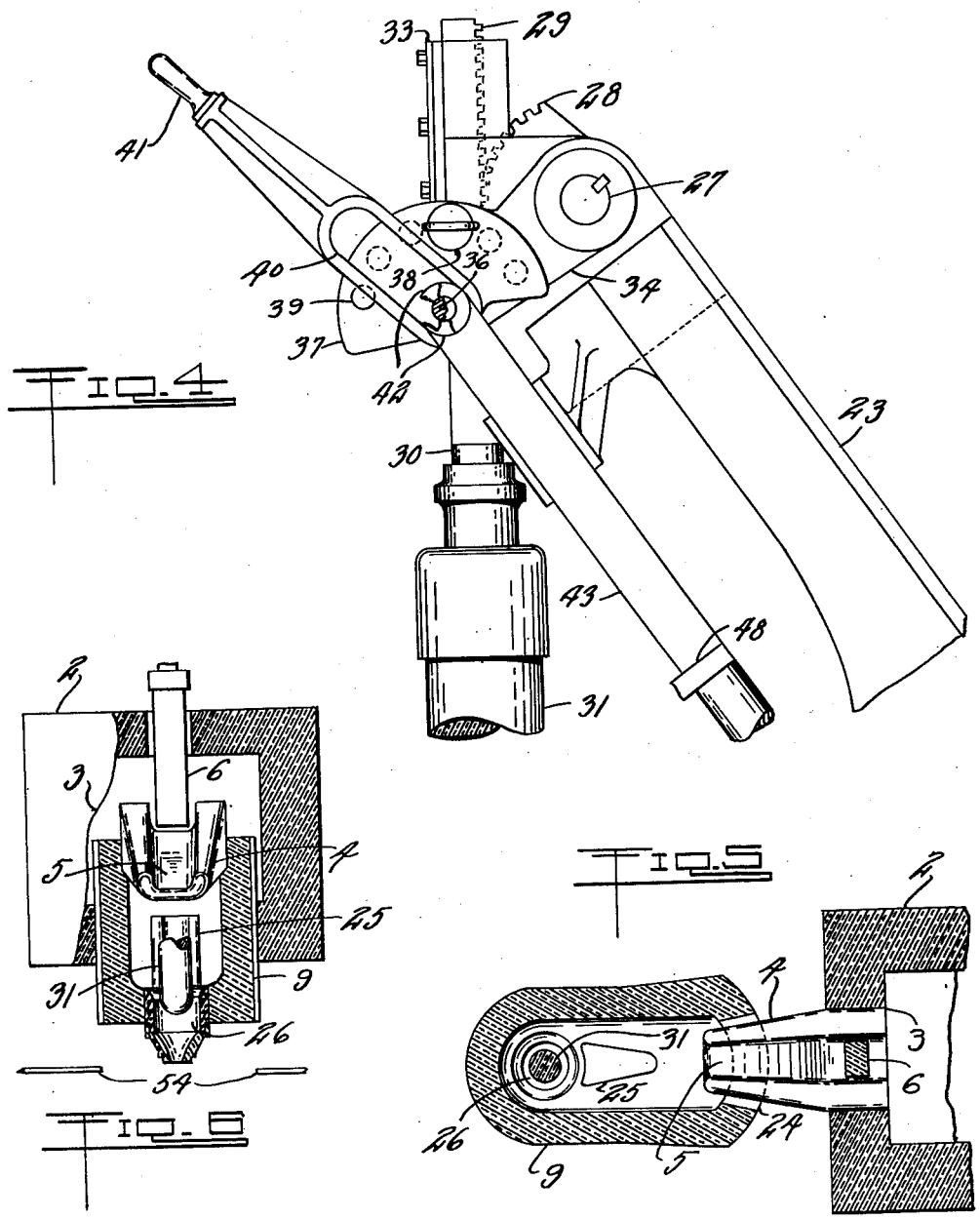

Patented Dec. 21, 1926.

1,611,362

UNITED STATES PATENT OFFICE.

FRANK O'NEILL, OF TOLEDO, OHIO.

ADJUSTABLE GLASS FEEDER.

Application filed March 1, 1924. Serial No. 696,343.

This invention relates to the feeding or gathering of molten glass from a pool or furnace in determined sections or gobs.

This invention has utility when incorporated in an automatic plunger type of feeder with features of measuring the quantity of glass due to adjustment.

Referring to the drawings:—

Fig. 1 is a fragmentary side elevation of an embodiment of the invention in connection with a glass furnace;

Fig. 2 is a power diagram of the feeder of Fig. 1;

Fig. 3 is a plan view, with parts broken away, of the feeder of Fig. 1;

Fig. 4 is a fragmentary detail view of the plunger lifter, or actuator;

Fig. 5 is a partial section on the line V—V, Fig. 1, and;

Fig. 6 is a partial section on the line VI—VI, Fig. 1.

Glass tank 1 is shown as having overhang 2. This overhang 2 is shown as having opening 3 provided with spout 4. Channel 5 in this spout 4 may be dammed or partially opened by block 6 as adjusted from wheel 7 thereby to allow determined rate of flow of molten glass 8, from the tank or main furnace 1 by way of this overhang 2 and the spout 4 into container 9.

Column 10 adjacent the forward or free end of the overhang 2 carries frame 11 having cheeks 12, 13, embracing the overhang 2. This frame 11 carries shaft 14 and housing 15. Crank 16 extending from the housing 15 carries worm 17 in mesh with worm wheel 18 fast on the shaft 14. This worm speed reduction gearing 17, 18, provides an angle of friction lock for holding the shaft 14 in adjusted position. On this shaft 14 is a pair of pinions 19 in mesh with racks 20 carried by plates 21 fixed with the container 9. These plates 21 have extension ribs 22 serving as guides in their travel between the frame 11 and the frame extension arms 23. Accordingly in rotating the crank 16 there is shifting upward or downward of the container or boot 9 relatively to the spout 4 which protrudes through opening 24 in delivering molten glass into the container 9, there to be spread by deflector 25 in flow toward bottom opening 26 in this container or boot 9.

The uprising or frame extension portions 23 as mounted fixed with the column 10 and frame 11 independently of the shiftable container, carry rock shaft 27 provided with segment 28 coacting with rack 29 of stem 30 connected to refractory plunger 31 extending through top opening 32 in the container 9 for glass flow control of the opening 26 in the bottom of this container 9. Guide yoke 33 from the shaft 27 and bracket portions 23 hold this rack 29 in mesh with the segment 28. This shaft 27 has fixed thereon an arm section 34 engaged by piston rod 43, which rod 43 in the lowermost position of the plunger 31 abuts lower end of the cylinder 44 to provide a stop 35 fixed with the bracket portion 23. Pin 36 swingably mounts arc plate 37 on the free end of this arm section 34 as an arm extension. The angular position of this arc plate 37 as to the arm 34 is determined by screw 38 as coacting in a seat 39 of the arm 34. This arm extension is provided with slot 40 with handle 41 therefrom operable when the pin or screw 38 is withdrawn for swinging this plate 37 into desired angular adjustment as to the main portion 34. In this slot 40 is roller 42 carried by piston rod 43 as extending from cylinder 44 mounted in fixed position with the bracket frame portion 23 and independently of the adjustable container 9.

Power air by way of line 45 entering the cylinder 44 effects thrusting of the piston rod 43 upward so that the roller 42 coacts with the slot 40 in swinging the arm 37, 34, to rock the shaft 27, and thereby lift such arm away from lower position as well as the plunger 31 away from its lower position as to the opening 26 in the container 9. In this upward movement a flow of glass from the opening 26 is permitted, and in the control, power air by way of line 46 to the upper end of the cylinder 44 effects a downward thrusting movement of the plunger 31 to force a charge of glass out of the opening 26 for delivery to a mold 47. In this downward travel of the plunger 31 and the piston rod 43 adjustable bracket 48 on the piston rod 43 has adjustable pin 49 thereon strike valve 50 thereby to control flow of power air from the line 51 to line 52 for operating cylinder 53 to effect cutting action by shears 54.

The volume of the charge of molten glass from this container 9 is varied of course by the consistency or fluidity of the glass. The thinner the glass the more rapid or greater quantity of flow at a given clearance in the stop position of the plunger 31 as to the opening 26. With the glass less fluid clearance of the plunger 31 as to the opening 26 may be greater, for the same volume of gob or gather. To adjust the gather volume such may be had during furnace operation hereunder and during the operation of the mold to the gather, by use of the crank 16. This adjustment by way of the crank 16 effects shifting of the container 9 as to the plunger 31 so that any nicety desired in clearance of the plunger 31 as to the opening 26 is conveniently effected. However, if it is desired to vary the length of stroke of the plunger 31 away from the opening 26, and this without varying the stop or lower position of the plunger 31, this is effected by varying the adjustment of the arm section 37 as to the arm section 34. To accomplish this latter adjustment it is necessary to stop the gather operation and allow one to remove the screw 38 and by means of handle 41 rock the guide slot 40 into the desired position thereby varying the effective length of the arm and accordingly adjusting the stroke upward of the plunger 31. Figs. 1, 4, show the position of rest or lower position for the piston rod 43 and the plunger 31. In the upward thrust of the piston rod 43, there is swinging of the arm 34 with the shaft 27. The shaft 27 is rotatively mounted in the frame 23 with which is fixed the cylinder 44 actuating the piston rod 43. The angular swing of the arm 34 is permitted by the slot 40 in the adjustable extension for the arm 34. The arm 34 provides by the pin 36, a mounting for the slot 40 fixed with arm section 37. This arm section 37 has its slot 40 on the side thereof away from the arm 34 and the mounting pin 36 does not interfere with the independent travel in this slot 40 of the roller 42 on the piston rod 43. As the arc plate 37 is shifted to have the screw 38 enter different holes 39, the direction of extent of the slot 40 may be toward the line or direction of the stroke of the piston rod 43 as shown in Fig. 4. It accordingly, follows, the thrust of the piston rod 43 has its effective component reduced so that the lifting action is decreased according to the extent of this adjustment.

Power air is admitted by line 55 when the bottle machine or other apparatus to which the gobs of glass are charged has completed its cycle of operations and is ready for a repetition thereof. This line 55 shifts valve 56 to permit flow of air from power supply line 57, by way of line 58, past one way check valve 59 to the line 46 for effecting downward thrusting of the plunger 31 in exuding a charge of glass from the container 9 by way of the opening 26. In this downward travel of the piston rod 43, the pin 49 is effective for opening the valve 50 to allow flow of power air by way of the line 51 as a branch of the line 58, to pass by way of the line 52 to valve 60 to shift such valve 60 to permit flow of power air from the line 57 past this valve 60 by way of line 61 to the shear cylinder 53 to effect closing operation of the shears 54. Branch 62 from the line 61 extends to valve 63 which is opened by this operation of the shears to allow air to flow by line 64 to the valves 56, 60 to effect a resetting of these valves 56, 60. The valve 60 thus acts to connect the power air line 57 to line 65 for opening the shears 54. The valve 56 as reset, connects the power air line 57 to the line 45 extending to the cylinder 44, there to effect lifting action of the plunger 31 away from the opening 26. This travel of the plunger 31 away from the opening 26 is adusted by the degree of the opening of cut off valve 67 in branch line 68 by-passing the check valve 59 from the line 46 to the line 58. The rate of exhaust from the cylinder 44 is thus adjusted. This power control is now in position for a repetition of its cycle of operations.

What is claimed and it is desired to secure by United States Letters Patent is:—

1. A glass supply, a spout therefrom, guide means adjacent said spout, a container of boot type coacting with said guide means and provided with a pair of racks, a shaft fixed with the supply, and pinions on said shaft coacting with said racks for shifting the container as to said supply.

2. A glass supply, a spout therefrom, guide means adjacent said spout, a container of boot type coacting with said guide means and provided with a pair of racks, a shaft fixed with the supply, pinions on said shaft coacting with said racks for shifting the container as to said supply, and a worm wheel drive for the shaft providing an angle of friction lock for holding the shaft in adjusted position.

3. A container for a pool of molten glass, said container being provided with a bottom opening and a side opening, a plunger coacting with said bottom opening, a spout extending into said side opening, a controllable dam in said spout, guide means for the container rigid with said spout, means for adjusting the container in said guide means as to said spout, and an actuator providing a cycle of movement for the plunger as to the container.

4. A glass feeder embodying a plunger, cylinder actuating means for the plunger, a mounting for the cylinder, a container provided with a bottom opening into which the plunger is operable, means for mounting the container independently of the cylinder for relative movement therebetween, guide means between the container and cylinder, a shear carried with the container independently of the cylinder and operable at said bottom opening, means for shifting the container and shear simultaneously relatively to the cylinder, and an actuator providing a cycle of movement for the plunger as to the container.

5. A container for a pool of molten glass, said container being provided with a bottom opening, a plunger, a control device for the plunger embodying an actuator for the plunger, and a stop for the plunger as to which the container is adjustable independently of affecting the stop as coacting to limit the plunger movement theretoward, said actuator comprising an adjustable lost motion transmission device to effect adjusted lifting of the plunger away from said stop.

In witness whereof I affix my signature.

FRANK O'NEILL.